United States Patent
Call et al.

(10) Patent No.: US 7,313,267 B2
(45) Date of Patent: Dec. 25, 2007

(54) AUTOMATIC ENCODING OF A COMPLEX SYSTEM ARCHITECTURE IN A PATTERN RECOGNITION CLASSIFIER

(75) Inventors: Charles Call, Owego, NY (US); Elliott D. Reitz, II, Bradenton, FL (US); Dennis A. Tillotson, Glen Aubrey, NY (US)

(73) Assignee: Lockheed Martin Corporation, Bethesda, MD (US)

( * ) Notice: Subject to any disclaimer, the term of this patent is extended or adjusted under 35 U.S.C. 154(b) by 714 days.

(21) Appl. No.: 10/293,349

(22) Filed: Nov. 13, 2002

(65) Prior Publication Data

US 2004/0091144 A1   May 13, 2004

(51) Int. Cl.
G06K 9/62   (2006.01)
(52) U.S. Cl. ...................... 382/159; 382/224
(58) Field of Classification Search ................ 382/159, 382/224
See application file for complete search history.

(56) References Cited

U.S. PATENT DOCUMENTS

| | | | |
|---|---|---|---|
| 4,481,665 A | * | 11/1984 | Ota ............................ 382/102 |
| 4,773,099 A | * | 9/1988 | Bokser ........................ 382/225 |
| 5,239,594 A | | 8/1993 | Yoda |
| 5,339,430 A | | 8/1994 | Lundin et al. |
| 5,386,568 A | | 1/1995 | Wold et al. |
| 5,428,791 A | | 6/1995 | Andrew et al. |
| 5,898,872 A | | 4/1999 | Richley |

OTHER PUBLICATIONS

Duda, Richard O.; Pattern Classification; c. 2001;Wiley-Interscience Publishing; Second Edition; p. 9-18 & p. 394-413.*

* cited by examiner

Primary Examiner—Bhavesh M Mehta
Assistant Examiner—Jonathan Schaffer
(74) Attorney, Agent, or Firm—Tarolli, Sundheim, Covell & Tummino LLP

(57) ABSTRACT

A method and computer program product are disclosed for automatically encoding a complex system architecture for a pattern recognition classifier. A plurality of subclassifier states are defined as a plurality of sets of state variables, each set of variables corresponding to a subclassifier state. A set of rules are then determined for a state machine governing transitions between the plurality of subclassifier states. The plurality of sets of state variables and the determined rules are encoded into a configuration file. This configuration file is provided to a generic classifier system, including a state machine and a predefined generic classifier object.

19 Claims, 6 Drawing Sheets

AUTOMATIC ENCODING OF A COMPLEX SYSTEM ARCHITECTURE IN A PATTERN RECOGNITION CLASSIFIER

BACKGROUND OF THE INVENTION

1. Technical Field

The invention relates to a method and computer program product for generating an adaptive system architecture in a pattern recognition device or classifier. Image processing systems often contain pattern recognition devices (classifiers).

2. Description of the Prior Art

Pattern recognition systems, loosely defined, are systems capable of distinguishing between various classes of real world stimuli according to their divergent characteristics. A number of applications require pattern recognition systems, which allow a system to deal with unrefined data without significant human intervention. By way of example, a pattern recognition system may attempt to classify individual letters to reduce a handwritten document to electronic text. Alternatively, the system may classify spoken utterances to allow verbal commands to be received at a computer console. In order to classify real-world stimuli, however, it is necessary to train the classifier to discriminate between classes by exposing it to a number of sample patterns.

A typical prior art classifier is trained over a plurality of output classes using a set of training samples. The training samples are processed, data relating to features of interest are extracted, and training parameters are derived from this feature data. As the system receives an input associated with one of a plurality of classes, it analyzes its relationship to each class via a classification technique based upon these training parameters. From this analysis, the system produces an output class and an associated confidence value.

In a classification system with a large number of output classes, many of the classes will be poorly separated within a feature space defined by one set of features, but will be easily distinguished using a different set. Likewise, different classification techniques may be useful for some sets of classes, but inefficient or inaccurate in distinguishing between another set. It is thus often more efficient to segment the classification task into a number of subclassifications, each with its own features, classification techniques, and specific prior and subsequent processing.

While large, complex architectures of subclassifiers can be useful when classifying across a large number of output classes, it is often necessary to string together the various subclassifiers with intermediate software coding. Such intermediate coding must be custom written for each subclassifier to define its specific features and classes and to indicate its relationship to other subclassifiers in the system. The custom coding required increases both the expense and time necessary to develop commercial classification systems.

SUMMARY OF THE INVENTION

In accordance with one aspect of the invention, a method is disclosed for automatically encoding a complex system architecture for a pattern recognition classifier. A plurality of subclassifier states are defined as a plurality of sets of state variables, each set of variables corresponding to a subclassifier state. A set of rules are then determined for a state machine governing transitions between the plurality of subclassifier states. The plurality of sets of state variables and the determined rules are encoded into a configuration file. This configuration file is provided to a generic classifier system, including a state machine and a predefined generic classifier object.

In accordance with another aspect of the invention, a computer program product, operative in a data processing system, is disclosed for automatically encoding a complex system architecture in a pattern recognition system. The computer program product includes a configuration determination portion and a generic classification system.

The configuration determination portion includes a component selection portion that defines a plurality of subclassifier states as a plurality of sets of state variables, with each set of variables corresponding to a subclassifier state. An architecture selection portion generates a set of rules for a state machine governing transitions between the plurality of subclassifier states.

The generic classification system includes a system memory for storing a configuration file output by the configuration determination portion. A predefined generic classifier object that is capable of assuming any of the plurality of states defined by the component selection portion is also present. A state machine, governed by the set of rules generated by the architecture selection portion, controls the transition of the classifier object between states in response to system events.

BRIEF DESCRIPTION OF THE DRAWINGS

The foregoing and other features of the present invention will become apparent to one skilled in the art to which the present invention relates upon consideration of the following description of the invention with reference to the accompanying drawings, wherein.

DETAILED DESCRIPTION OF THE INVENTION

In accordance with the present invention, a method and computer program product are described for generating an adaptive system architecture in a pattern recognition device or classifier. The disclosed invention may be applied to classifiers used in any traditional pattern recognition classifier task, including, for example, optical character recognition (OCR), speech translation, and image analysis in medical, military, and industrial applications.

It should be noted that a pattern recognition classifier to which the present invention may be applied will typically be implemented as a computer program, preferably a program simulating, at least in part, the functioning of a neural network. Accordingly, understanding of the present invention will be facilitated by an understanding of the operation and structure of a neural network.

Figure 1:
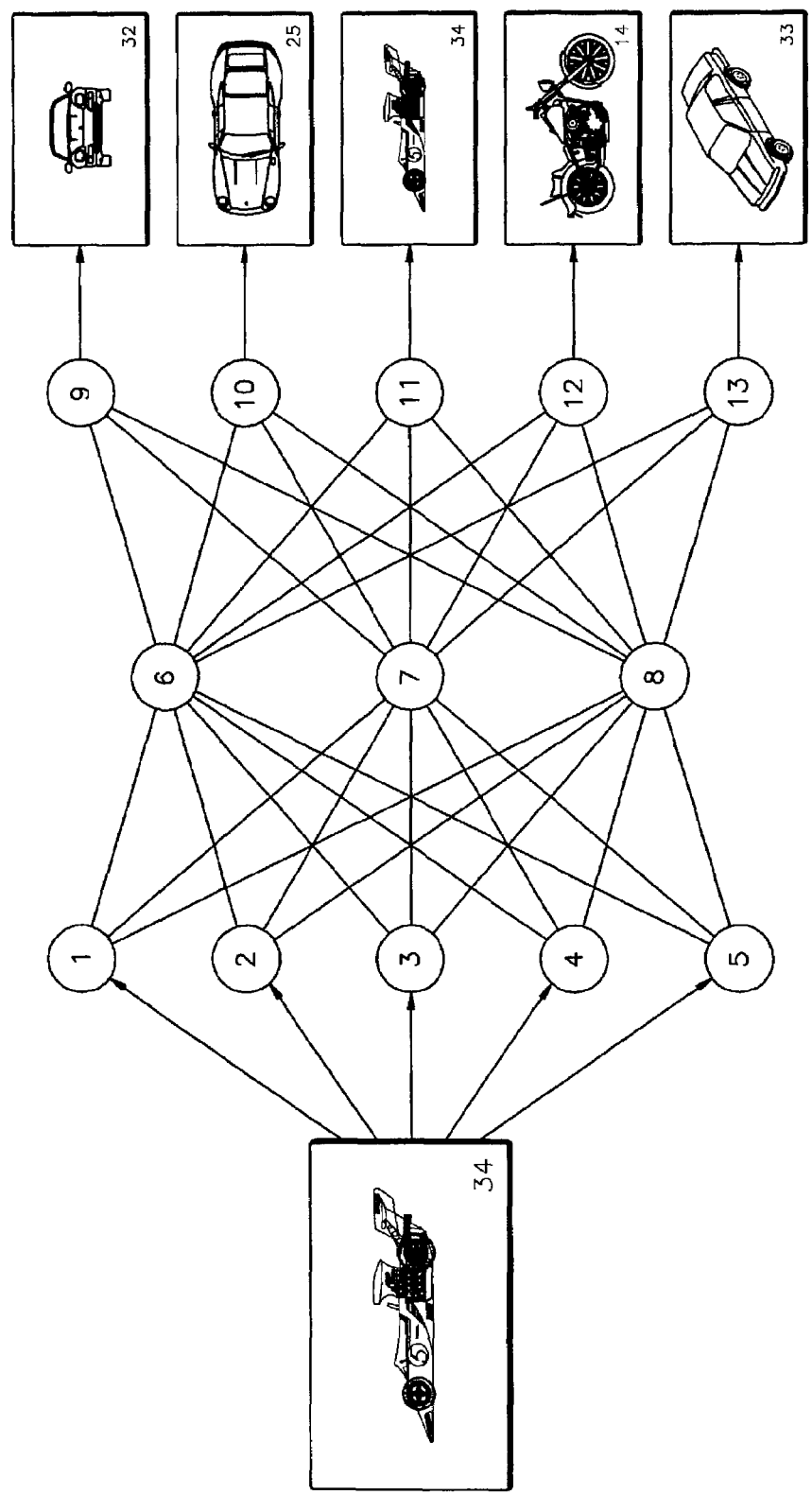
FIG. 1 is an illustration of an exemplary neural network utilized for pattern recognition.

FIG. 1 illustrates a neural network that might be used in a pattern recognition task. The illustrated neural network is a three-layer back-propagation neural network used in a pattern classification system. It should be noted here that the neural network illustrated in FIG. 1 is a simple example solely for the purposes of illustration. Any nontrivial application involving a neural network, including pattern classification, would require a network with many more nodes in each layer. In addition, additional hidden layers might be required.

In the illustrated example, an input layer comprises five input nodes, 1-5. A node, generally speaking, is a processing unit of a neural network. A node may receive multiple inputs from prior layers which it processes according to an internal formula. The output of this processing may be provided to multiple other nodes in subsequent layers. The functioning of nodes within a neural network is designed to mimic the function of neurons within a human brain.

Each of the five input nodes 1-5 receives input signals with values relating to features of an input pattern. By way of example, the signal values could relate to the portion of an image within a particular range of grayscale brightness. Alternatively, the signal values could relate to the average frequency of an audio signal over a particular segment of a recording. Preferably, a large number of input nodes will be used, receiving signal values derived from a variety of pattern features.

Each input node sends a signal to each of three intermediate nodes 6-8 in the hidden layer. The value represented by each signal will be based upon the value of the signal received at the input node. It will be appreciated, of course, that in practice, a classification neural network may have a number of hidden layers, depending on the nature of the classification task.

Each connection between nodes of different layers is characterized by an individual weight. These weights are established during the training of the neural network. The value of the signal provided to the hidden layer by the input nodes is derived by multiplying the value of the original input signal at the input node by the weight of the connection between the input node and the intermediate node. Thus, each intermediate node receives a signal from each of the input nodes, but due to the individualized weight of each connection, each intermediate node receives a signal of different value from each input node. For example, assume that the input signal at node 1 is of a value of 5 and the weights of the connections between node 1 and nodes 6-8 are 0.6, 0.2, and 0.4 respectively. The signals passed from node 1 to the intermediate nodes 6-8 will have values of 3, 1, and 2.

Each intermediate node 6-8 sums the weighted input signals it receives. This input sum may include a constant bias input at each node. The sum of the inputs is provided into a transfer function within the node to compute an output. A number of transfer functions can be used within a neural network of this type. By way of example, a threshold function may be used, where the node outputs a constant value when the summed inputs exceed a predetermined threshold. Alternatively, a linear or sigmoidal function may be used, passing the summed input signals or a sigmoidal transform of the value of the input sum to the nodes of the next layer.

Regardless of the transfer function used, the intermediate nodes 6-8 pass a signal with the computed output value to each of the nodes 9-13 of the output layer. An individual intermediate node (i.e. 7) will send the same output signal to each of the output nodes 9-13, but like the input values described above, the output signal value will be weighted differently at each individual connection. The weighted output signals from the intermediate nodes are summed to produce an output signal. Again, this sum may include a constant bias input.

Each output node represents an output class of the classifier. The value of the output signal produced at each output node represents the probability that a given input sample belongs to the associated class. In the example system, the class with the highest associated probability is selected, so long as the probability exceeds a predetermined threshold value. The value represented by the output signal is retained as a confidence value of the classification.

Figure 2:
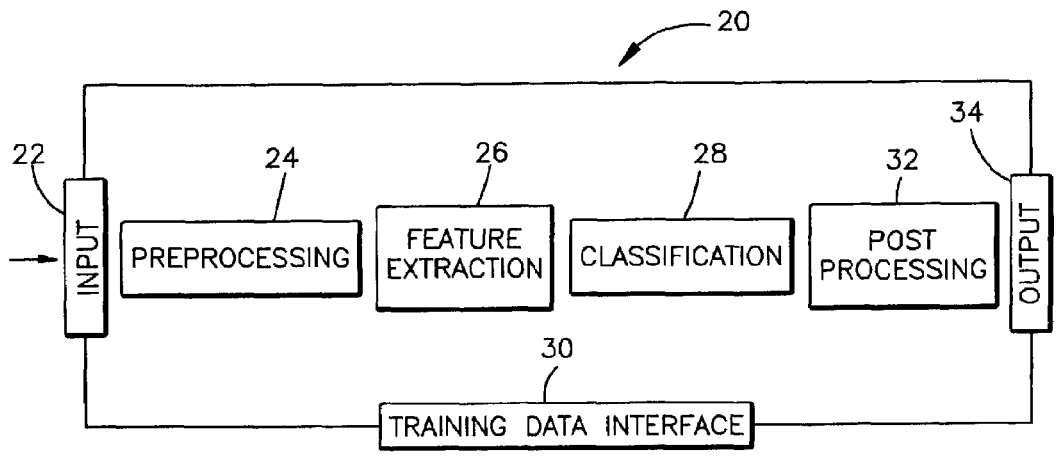
FIG. 2 is a functional diagram of a generic classifier compatible with the present invention.

FIG. 2 is a functional diagram of a generic classifier 20 that might be used in association with the present invention. As stated above, the present invention and any associated classification system may be implemented as software programs. Therefore, the structures described hereinafter may be considered to refer to individual modules and tasks within these programs.

The generic classifier 20 is intended to be the parent object of a plurality of subclassifiers created via the present invention. Accordingly, the generic classifier 20 contains all of the components, classes, and features utilized in each of the subclassifiers. Because each of the subclassifiers is defined as a state of this generic classifier object, each of the plurality of state variables can be reduced to a set of state variables for this object. Accordingly, a prior art multilayer classification system can be reduced to the generic classifier 20 and a configuration file containing appropriate sets of state variables.

Focusing on the function of the generic classifier 20, the classification process begins at an input 22 with the acquisition of an input pattern. The pattern is then sent to a preprocessing stage 24, where the pattern may be segmented into candidate objects, analyzed to locate regions of interest, and otherwise processed to prepare the pattern for further processing. A number of preprocessing techniques will be available for user selection. In the context of preprocessing an image, these may include reducing or thickening lines within an image, downscaling the image, or producing a binary representation of the image.

The preprocessed pattern segments are then sent to a feature extraction stage 26. Feature extraction converts the pattern into a vector of numerical measurements, referred to as feature variables. These feature variables, collectively referred to as a feature vector, represent the pattern in a compact form. A large number of feature variables can be defined for any particular application, and while not all can be included with a generic classifier, a representative sample of the possible features will be available. Two example feature variable sets in an image recognition system are a histogram feature variable set and a "Scaled 16" feature variable set.

A grayscale image consists of a number of individual pixels, each possessing an individual level of brightness, or grayscale value. A histogram feature variable set focuses on the grayscale value of the individual pixels within the image. Each of the histogram feature variables represents a range of grayscale values. The values for the histogram feature variables are derived from a count of the number of pixels within the image having a grayscale value within each range. By way of example, if there are sixteen variables in the histogram feature variable set, the first variable might represent the number of pixels falling within the lightest portion of the range all possible grayscale values.

The "Scaled 16" feature variable set represents the average grayscale values of the pixels within sixteen preselected areas of the image. By way of example, the sixteen areas may be defined by a four by four equally spaced grid superimposed across the image. Thus, the first variable of the set would represent the average or summed value of the pixels within the upper left region of the grid.

The extracted feature vector is then provided to a classification stage 28. The classification stage 28 uses training data provided through a data interface 30 to relate the feature vector to a most likely output class or determine a confidence value that the pattern is a member of a preselected class. This determination can be accomplished by any of a number of classification techniques included with the generic classifier. Useful classification techniques include Bayesian distance techniques, techniques based on radial basis functions, and Kohonen self-organizing maps.

Finally, the recognition result is sent to a post-processing stage 32. The post-processing stage 32 performs any additional processing desired upon the newly classified image. A wide range of post-processing applications may be included with a generic classifier. Examples include optimization procedures, noise reduction processes, and classifier refinement techniques. The classification result is output at an output 34.

Figure 3:
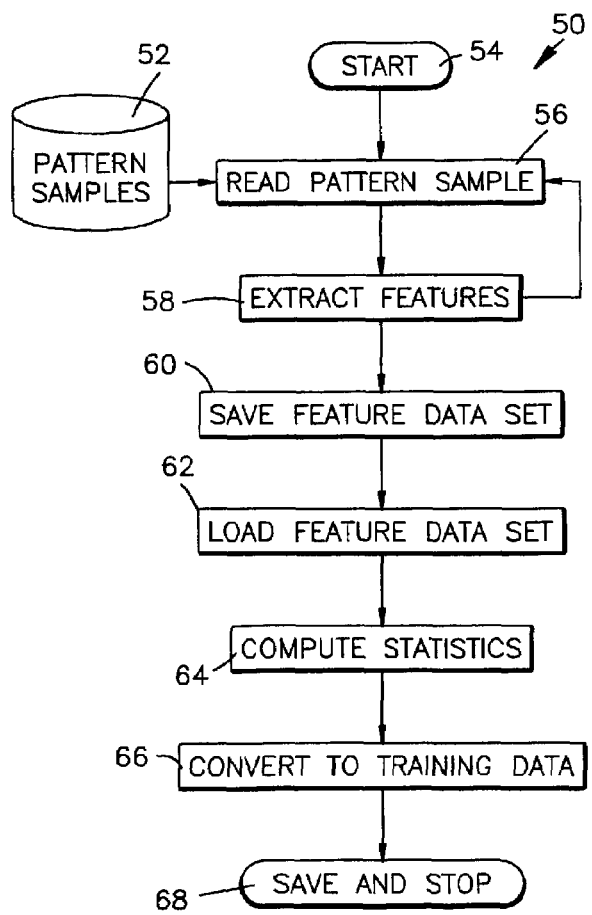
FIG. 3 is a flow diagram illustrating a training process compatible with the present invention.

FIG. 3 is a flow diagram illustrating the operation of a prior art computer program 50 that may be used to provide training statistics for the subclassifiers of the present invention. A number of pattern samples 52 are generated or collected from a population of real-world patterns. The number of pattern samples necessary for training varies with the application. The number of output classes, the selected features, and the nature of the classification technique used directly affect the number of samples needed for good results for a particular classification system. While the use of too few images can result in an improperly trained subclassifier, the use of too many samples can be equally problematic, as it can take too long to process the training data without a significant gain in performance.

The actual training process begins at step 54 and proceeds to step 56. At step 56, the program retrieves a pattern sample from memory. The process then proceeds to step 58, where the pattern sample is converted into a feature vector input similar to those a classifier would see in normal run-time operation. After each sample feature vector is extracted, the results are stored in memory, and the process returns to step 56. After all of the samples are analyzed, the process proceeds to step 60, where the feature vectors are saved to memory as a set.

The actual computation of the training data begins in step 62, where the saved feature vector set is loaded from memory. After retrieving the feature vector set, the process progresses to step 64. At step 64, the program calculates statistics, such as the mean and standard deviation of the feature variables for each class. Intervariable statistics may also be calculated, including a covariance matrix of the sample set for each class. The process then advances to step 66 where it uses the set of feature vectors to compute the training data. At this step in the example embodiment, an inverse covariance matrix is calculated, as well as any fixed value terms needed for the classification process. After these calculations are performed, the process proceeds to step 68 where the training parameters are stored in memory and the training process ends.

Figure 4:
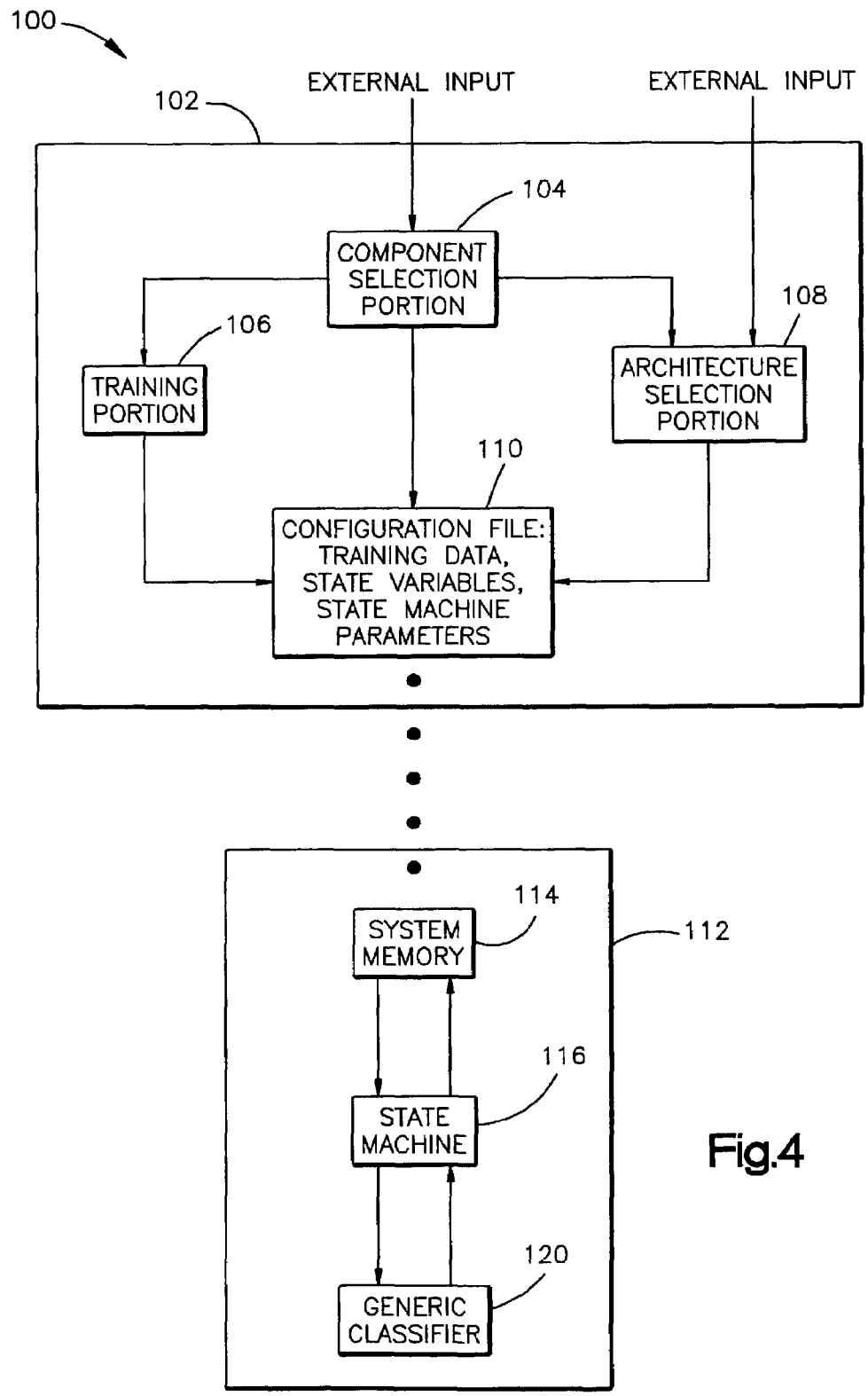
FIG. 4 is a functional diagram of an example embodiment of the present invention.

FIG. 4 is a functional diagram of an example embodiment of the classifier generation system 100 of the present invention. Generation of a classifier begins at a configuration determination portion 102. Within the configuration determination portion 102, a component selection portion 104, defines a number of subclassifier states. Each subclassifier state is defined in relation to the generic classifier object. As discussed above, the generic classifier object includes a number of components that can be selected for each subclassifier state. The components include pre-processing routines, feature extraction processes, classification techniques, and post-processing operations. Each subclassifier state includes a subset of the available components. The state variables defining the subclassifier state indicate the components selected for the subclassifier. For example, while the generic classifier may be capable of providing both a scaled 16 feature variable set and a histogram 16 feature variable set, a particular subclassifier may use only the scaled 16 variables.

Figure 5:
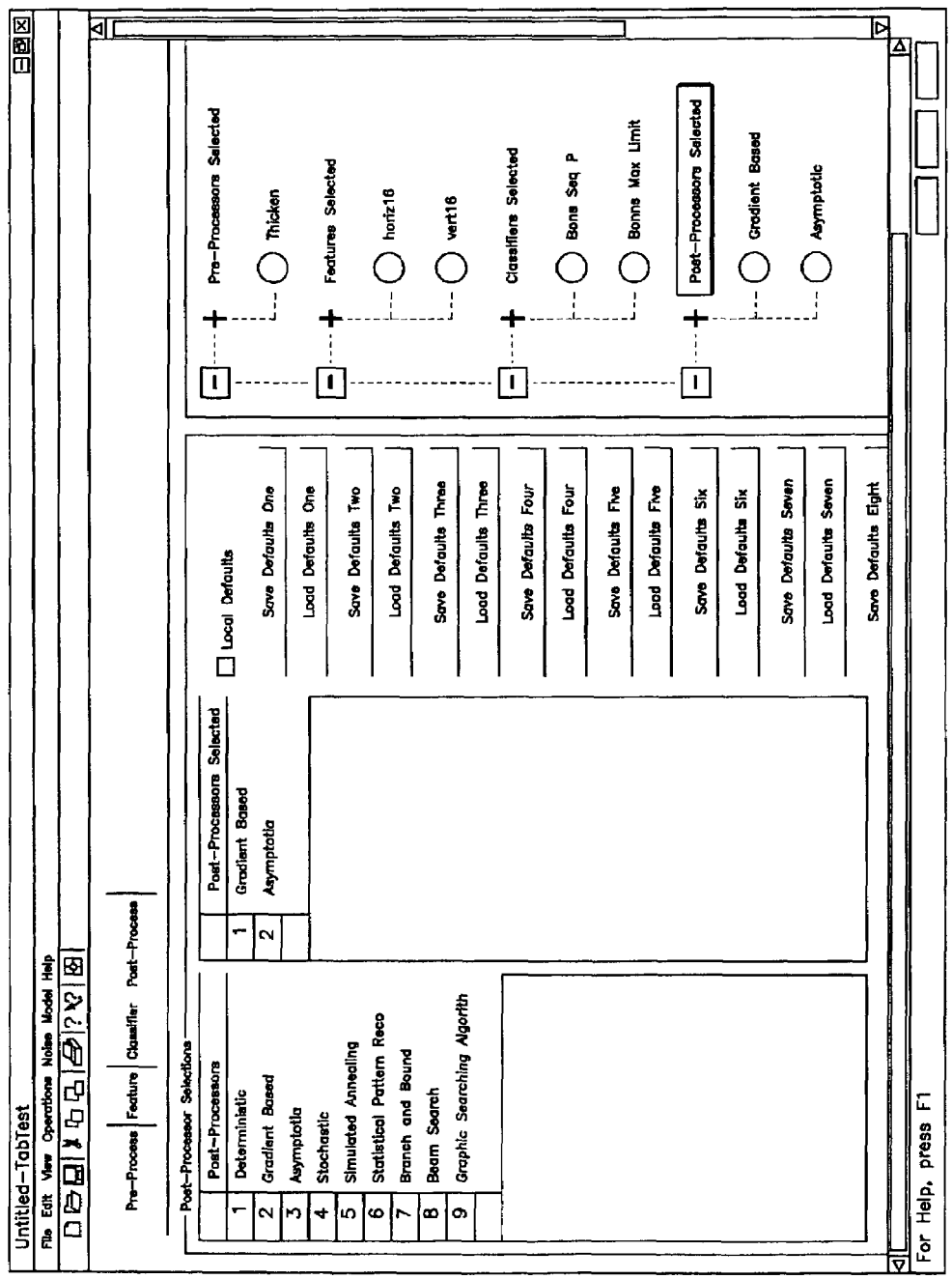
FIG. 5 is a screenshot of a graphic user interface used in an example embodiment of the present invention.

The components for each subclassifier state can be either selected by the user or determined automatically by the system. For example, components for the subclassifier states could be determined by an optimization within the system. A cost function for classification could be used as a feature metric to be optimized by this process. In the example embodiment, the components are selected by a user through a graphic user interface. FIG. 5 is a sample screen shot from a graphic user interface of an example embodiment.

After the classifier states are defined, the subclassifier state information is provided to a training portion 106. For each subclass, a number of sample images from each class are preprocessed in accordance with the preprocessing components selected in the component selection portion 104. Feature data corresponding to the features selected for the subclass is then extracted. Finally, the extracted feature data is used to calculate training statistics for each class represented by the subclassification state. Thus, the training portion 106 generates training statistics associated with each subclassifier state.

The defined subclasses are also provided to an architecture selection portion 108. At the architecture selection portion 108, a set of rules is generated to govern transitions between subclassifier states. The selected rules can range from a simple static order of classifier states to a dynamic selection process based upon one or more state variables. For example, the selected rules could require the system to select between several subclassifier states based upon the results of the previous classification. Alternatively, the rules may require selection of the subclassifier state with the highest value of a predefined variable.

Figure 6:
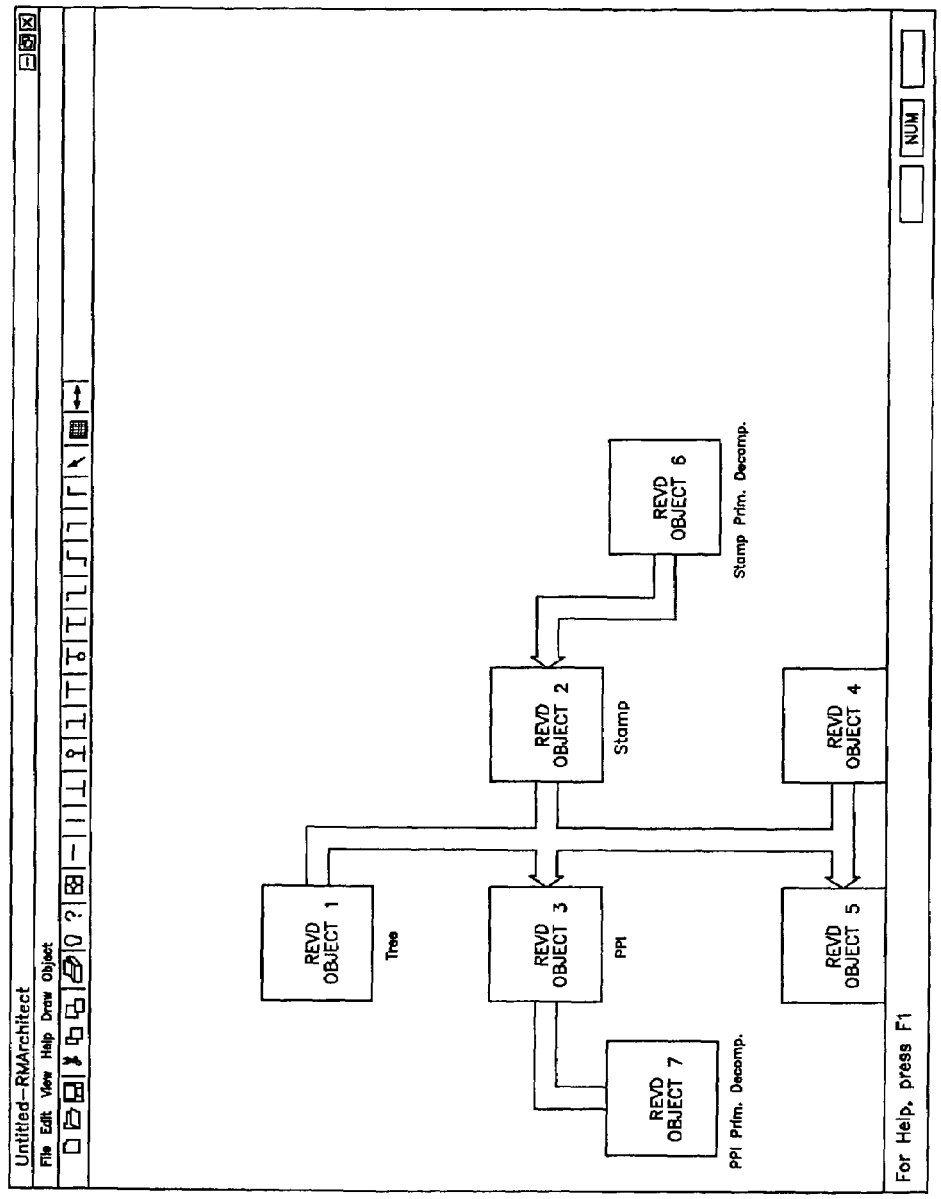
FIG. 6 is a screenshot of a graphic user interface used in an example embodiment of the present invention.

The system architecture can be generated either by the user or determined automatically by the system. For example, an architecture could be determined by an optimization or clustering algorithm within the system. Such a algorithm might determine the separation of the classes represented by the system in feature space, and create subclassifiers in such a way as to maximize this separation. In the example embodiment, the architecture is determined by a user through a graphic user interface. FIG. 6 is a sample screen shot from a graphic user interface of an example embodiment.

The results of the component selection portion 104 and the architecture selection portion 108 are formatted and saved as a configuration file 110. The configuration file 110 will also contain the training statistics for each subclassifier state, as derived in the training portion 106. The configuration file can be stored in any conventional computer memory.

The configuration file 110 is provided to a generic classification system 112 and stored at a system memory 114.

During classifier operation, a state machine 116 determines which subclassifier state should be active in the machine at a given time. The state machine 116, as described above, is governed by the set of rules selected in the architecture selection portion 108. When the state machine 116 selects a subclassifier state, the appropriate state variables are provided to the generic classifier 120. Accordingly, the generic classifier 120 enters the appropriate state for perform the desired classification task. This process continues until the state machine 116 reaches an accept state, at which point the classification result achieved in that subclassifier state will represent the system output.

It should be noted that once the generic classification system 112 is provided with a configuration file 110, the system becomes self-contained. Accordingly, the resulting product can be provided to a customer as a "black box" classifier (i.e. the configuration determination portion 102 need not be provided as part of the product).

Figure 7:
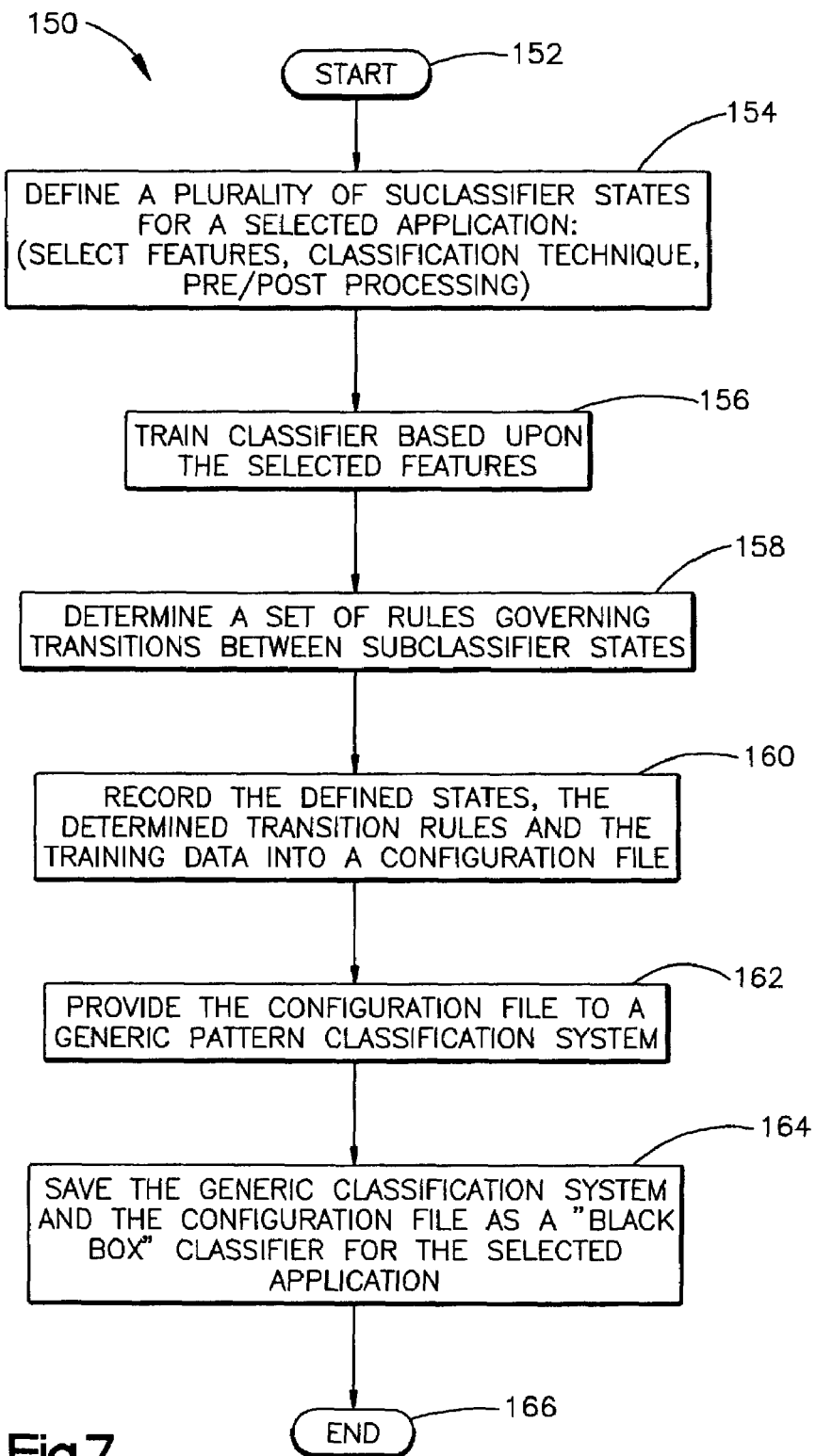
FIG. 7 is a flow diagram of the run-time operation of an example embodiment of the present invention.

FIG. 7 is a flow diagram illustrating the run-time operation of an example embodiment of the present invention. In the example embodiment, the generic classifier contains components appropriate for a postal indicia recognition application, and the "black box" product is intended for use in such an application. The process 150 begins at step 152. At step 154, the component selection portion defines a plurality of subclassifier states for a selected application. Each subclassifier state is represented as a set of state variables for the generic classifier. The process then advances to step 156, where training statistics are calculated from a number of class samples representing each class. Using the selected pre-processing components and feature sets for each subclassifier, the training portion extracts feature data from this plurality of class-representative samples. The training portion then calculates training statistics from this extracted data for the classes represented by each classifier.

The process then advances to step 158, where the architecture selection portion determines a classifier architecture for the subclassifier states. The classifier architecture is simply a set of rules governing transitions between subclassifier states. Once the classifier architecture is established, the process proceeds to step 160.

At step 160, the state variable sets representing the defined subclassifiers, the training statistics, and the classifier architecture are all recorded as a configuration file. At step 162, this file is provided to a generic pattern classification system. The generic classification system contains a generic classifier object capable of assuming the defined classifier states. The process then continues to step 164, where the generic classification system and the configuration file are saved together as a single "black box" classifier system. The generic classification system, combined with the generated configuration file, allows the generic classifier to perform complex classification tasks requiring a number of subclassification modules without the necessity of linking the subclassification modules together with custom intermediate software. The process terminates at step 166.

It will be understood that the above description of the present invention is susceptible to various modifications, changes and adaptations, and the same are intended to be comprehended within the meaning and range of equivalents of the appended claims. The presently disclosed embodiments are considered in all respects to be illustrative, and not restrictive. The scope of the invention is indicated by the appended claims, rather than the foregoing description, and all changes that come within the meaning and range of equivalence thereof are intended to be embraced therein.

The invention claimed is:

1. A method for automated encoding of complex system architectures for a pattern recognition classifier, comprising:
   creating a generic classification object having a plurality of associated features, a plurality of associated output classes, a plurality of associated classification techniques, and a plurality of associated preprocessing techniques;
   generating a configuration file for the generic classification object, wherein generating the configuration file comprises:
      defining a plurality of subclassifiers, wherein each subclassifier is defined as a plurality of selected classifier components associated with a the generic classifier, the plurality of selected components comprising:
         a subset of a plurality of features associated with the generic classifier;
         a subset of a plurality of output classes associated with the generic classifier;
         at least one classification technique from a plurality of classification techniques associated with the generic classifier; and
         a subset of a plurality of preprocessing techniques associated with the generic classifier; and
      establishing a set of rules for transitioning among the defined plurality subclassifiers such that a classification result from a first subclassifiers from the defined plurality of subclassifiers is utilized to select between at least second and third subclassifiers from the plurality of subclassifiers;
      encoding the established set of rules and the selected plurality of classifier components for each of the defined plurality of subclassifiers into the configuration file;
   providing the configuration file to the generic classifier object via a computer network; and
   combining a first instance of the generic classifier object with the configuration file as to produce a first functional classification system having a complex system architecture.

2. The method of claim 1, further comprising:
   defining a second plurality of subclassifiers, wherein defined as a plurality of selected components associated with the generic classifier;
   establishing a second set of rules far transitioning among the defined second plurality of subclassifiers such that a classification result from a first subclassifier from the second plurality of subclassifiers is utilized to select between at least second and third subclassifiers from the second plurality of subclassifiers;
   encoding a second configuration file comprising the established second set of rules and the selected plurality of classifier components for each of the second defined plurality of subclassifiers; and
   combining a second instance of the generic classifier, that is functionally identical to the first instance of the generic classifier, with the second configuration file as to produce a second functional classification system having a complex system architecture that is different than the system architecture associated with the first classification system.

3. The method of claim 1, wherein defining a plurality of subclassifiers comprises defining a plurality of subclassifiers via an automated optimization algorithm.

4. The method of claim 3, wherein defining the plurality of subclassifiers comprises selecting the components of a given subclassifier as to maximize the separation of its associated subset of output classes in a feature space defined by its associated subset of features.

5. The method of claim 1, wherein the set of rules for transitioning among the defined plurality subclassifiers is established via an automated clustering algorithm.

6. The method of claim 1, the method further comprising the step of calculating training statistics for each of the plurality of subclassifiers.

7. The method of claim 1, wherein the plurality of output classes associated with the pattern recognition classifier represent varieties of postal indicia.

8. A system for automatically establishing a complex system architecture in a pattern recognition system, comprising:
    a first computer readable medium that stores a first instance of a generic classifier having a plurality of associated features, a plurality of associated output classes, a plurality of associated classification techniques, and a plurality of associated preprocessing techniques;
    a system memory comprising executable instructions for generating a configuration file; and
    a processing unit for accessing the memory and for executing the computer executable instructions, the computer executable instructions comprising:
    a component selector that defines a plurality of subclassifiers, wherein each subclassifier comprises a subset of the features associated with the generic classifier, a subset of the output classes associated with the generic classifier, at least one classification technique associated with the generic classifier, and a subset of the plurality of preprocessing techniques associated with the generic classifier;
    an architecture selector that establishes a set of rules for transitioning among subclassifiers such that a classification result from a first subclassifier from the plurality of subclassifiers is utilized to select between at least second and third subclassifiers from the plurality of subclassifiers; and
        a coding segment that encodes a configuration file comprising the established set of rules and the selected plurality of classifier components for each of the defined plurality subclassifiers, such that that the configuration file can be provided to the first instance of the generic classifier on the first computer readable medium to provide a functional classification system having a complex architecture.

9. The system of claim 8, wherein the component selector comprises an automated optimization algorithm.

10. The system of claim 9, wherein the automated optimization algorithm selects the components of a given subclassifier as to maximize the separation of its associated subset of output classes in a feature space defined by its associated subset of features.

11. The system of claim 8, wherein the architecture selector comprises an automated clustering algorithm.

12. The system of claim 8, the executable instructions further comprising a training portion that computes training statistics for each of the plurality of subclassifiers.

13. The system of claim 8, wherein the plurality of output classes associated with the generic classifier represent varieties of postal indicia.

14. A computer readable medium comprising executable instructions for automatically encoding a complex system architecture in a pattern recognition system, comprising:
    a component selector that defines a plurality of subclassifiers, wherein each subclassifier comprises a subset of the features associated with a generic classifier module, a subset of the output classes associated with the generic classifier, at least one classification technique associated with the generic classifier, and a subset of the plurality of preprocessing techniques associated with the generic classifier module; and
    an architecture selector that establishes a set of rules for transitioning among the plurality of subclassifiers such that a classification result from a first subclassifier from the plurality of subclassifiers is utilized to select between at least second and third subclassifiers from the plurality of subclassifiers;
    wherein the system is operative to record a configuration file that includes the established set of rules and, for each of the defined plurality of subclassifiers, the subset of features, the subset of output classes, the at least one classification technique, and the subset of the plurality of preprocessing techniques that comprise the subclassifier, such that the configuration file can be provided to an instance of a generic classifier module to provide a functional classification system having a complex architecture.

15. The computer readable medium of claim 14, wherein the component selector comprises an automated optimization algorithm.

16. The computer readable medium of claim 15, wherein the automated optimization algorithm selects the components of a given subclassifier as to maximize the separation of its associated subset of output classes in a feature space defined by its associated subset of features.

17. The computer readable medium of claim 14, wherein the architecture selector comprises an automated clustering algorithm.

18. The computer readable medium of claim 14, further comprising a training portion that computes training statistics for each of the plurality of subclassifiers.

19. The computer readable medium of claim 14, wherein the plurality of output classes associated with the generic classifier represent varieties of postal indicia.

* * * * *